United States Patent
Bridges

(10) Patent No.: US 8,781,809 B2
(45) Date of Patent: Jul. 15, 2014

(54) SOFTWARE MODELING SYSTEMS FOR METERING AND TRANSLATING MEASUREMENTS

(75) Inventor: Seth W. Bridges, Seattle, WA (US)

(73) Assignee: GridPoint, Inc., Arlington, VA (US)

(*) Notice: Subject to any disclaimer, the term of this patent is extended or adjusted under 35 U.S.C. 154(b) by 1045 days.

(21) Appl. No.: 12/751,852

(22) Filed: Mar. 31, 2010

(65) Prior Publication Data

US 2011/0010158 A1    Jan. 13, 2011

Related U.S. Application Data

(60) Provisional application No. 61/165,344, filed on Mar. 31, 2009.

(51) Int. Cl.
*G06G 7/54* (2006.01)

(52) U.S. Cl.
USPC .................................... 703/18; 703/2; 703/13

(58) Field of Classification Search
None
See application file for complete search history.

(56) References Cited

U.S. PATENT DOCUMENTS

| | | | |
|---|---|---|---|
| 6,278,898 B1* | 8/2001 | Shah | 700/29 |
| 7,937,247 B2* | 5/2011 | Carter et al. | 702/189 |
| 2008/0039980 A1* | 2/2008 | Pollack et al. | 700/295 |
| 2009/0040029 A1* | 2/2009 | Bridges et al. | 340/310.11 |

OTHER PUBLICATIONS

McGready, "Confidence Intervals", Johns Hopkins University, 2006, 171 pages.*

* cited by examiner

*Primary Examiner* — Omar Fernandez Rivas
*Assistant Examiner* — Herng-Der Day
(74) *Attorney, Agent, or Firm* — Greenberg Traurig LLP

(57) ABSTRACT

Systems and methods are provided for collecting and aggregating a plurality of power flow measurements from a plurality of devices in a power management system. The error bounds of the aggregated power flow measurement are then determined using at least one error model. Systems and methods are also provided for inferring AC power flows from DC power flows. A device having at least one DC power flow sensor is augmented with at least one AC power flow sensor AC and DC power flows through the device are measured using the sensors over a range of operating points. An inference model of AC power flow in the device as a function of DC power flow is then built, wherein the error of the model is bounded. DC power flow through the device and in similar devices can then be then measured and used to infer AC power flow for the device.

18 Claims, 13 Drawing Sheets

"PRIOR ART"

"PRIOR ART"

"PRIOR ART"

"PRIOR ART"

"PRIOR ART"

"PRIOR ART"

"PRIOR ART"

"PRIOR ART"

SOFTWARE MODELING SYSTEMS FOR METERING AND TRANSLATING MEASUREMENTS

This non-provisional patent application claims priority to, and incorporates herein by reference, U.S. Provisional Patent Application No. 61/165,344 filed on Mar. 31, 2009. This application also incorporates herein by reference the following: U.S. patent application Ser. No. 12/252,657 filed Oct. 16, 2008; U.S. patent application Ser. No. 12/252,209 filed Oct. 15, 2008; U.S. patent application Ser. No. 12/252,803 filed Oct. 16, 2008; and U.S. patent application Ser. No. 12/252,950 filed Oct. 16, 2008.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of electric vehicles, and in particular to novel systems and methods for communication and interaction between electric vehicles and the electrical grid.

BACKGROUND OF THE INVENTION

Low-level electrical and communication interfaces to enable charging and discharging of electric vehicles with respect to the grid is described in U.S. Pat. No. 5,642,270 to Green et al., entitled, "Battery powered electric vehicle and electrical supply system," incorporated herein by reference. The Green reference describes a bi-directional charging and communication system for grid-connected electric vehicles.

Modern automobiles, including electric vehicles, have many electronic control units for various subsystems. While some subsystems are independent, communications among others are essential. To fill this need, controller-area network (CAN or CAN-bus) was devised as a multi-master broadcast serial bus standard for connecting electronic control units. Using a message based protocol designed specifically for automotive applications, CAN-bus is a vehicle bus standard designed to allow microcontrollers and devices to communicate with each other within a vehicle without a host computer. The CAN-bus is used in vehicles to connect the engine control unit, transmission, airbags, antilock braking, cruise control, audio systems, windows, doors, mirror adjustment, climate control, and seat control. CAN is one of five protocols used in the (On-Board Diagnostics) OBD-II vehicle diagnostics standard.

Modern vehicles contain a variety of subsystems that may benefit from communications with various off-vehicle entities. As the smart energy marketplace evolves, multiple application-level protocols may further develop for the control of power flow for electric vehicles and within the home. For example, energy management protocols are being developed for both Zigbee and Homeplug. A vehicle manufacturer may need to support multiple physical communications mediums. For example, ZigBee is used in some installations while PLC is used in others. Considering the very long service life of items such as utility meters and automobiles, the use of multiple incompatible protocols may pose an barrier to deployment. For example, if a homeowner buys a car that utilizes one protocol and receives a utility meter that uses another protocol, it is unlikely that either device will quickly replace other device.

Significant opportunities for improvement exist with respect to metering and translating measurements for power grids and electric vehicles. What is needed are systems and methods that provide for the efficient transfer of higher levels of information dealing with mobile populations of electric vehicles, the complexities of accurately metering such large populations.

SUMMARY OF THE INVENTION

In one embodiment the invention is a method. A plurality of power flow measurements are received from each of a plurality of devices. Each device is associated with a power flow and is capable of measuring the respective device's power flow within a measurement error. The plurality of power flow measurements are aggregated, using a computing device, producing an aggregated power flow measurement. The error bounds of the aggregated power flow measurement are then determined, using the computing device, using at least one error model.

In another embodiment the invention is a system. The system comprises: a plurality of devices, each device being associated with a power flow, each of the devices being capable of measuring the respective device's power flow within a measurement error; an aggregate power measurement module comprising one or more processors programmed to execute software code retrieved from a computer readable storage medium storing software for a method. The method comprises the steps of receiving, over a network, a plurality of power flow measurements from each of the plurality of devices; aggregating the power flow measurements, producing an aggregated power flow measurement; and determining the error bounds of the aggregated power flow measurement using at least one error model.

In another embodiment, the invention is a method. A device having at least one DC power flow sensor is augmented with at least one AC power flow sensor and AC and DC power flows through the device are measured using the sensors over a range of operating points. An inference model of AC power flow in the device as a function of DC power flow is then built, wherein the error of the model is bounded. The AC power flow sensor can then be removed from the device. The DC power flow through the device is then measured and the AC power flow for the device is inferred, using the computing device, using the inference model.

In another embodiment the invention is a system. The system comprises a plurality of endpoint devices, each endpoint device having at least one sensor for measuring power flow through the respective device, wherein one or more of the at least one of sensors are DC sensors. The system further comprises an inference module comprising one or more processors programmed to execute software code retrieved from a computer readable storage medium storing software for a method comprising the steps: receiving measurements, over a network, from each of the sensors; and inferring an AC power flow of the plurality of endpoint devices using the measurements, wherein AC power flow for devices having DC sensors is inferred using an inference model developed by measuring the relationship of AC power flow to DC sensor measurements in devices similar to the respective device.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

FIG. 8C is an illustration of an example of simple user interface for facilitating user controlled charging.

DETAILED DESCRIPTION OF THE EMBODIMENTS

Figure 1:
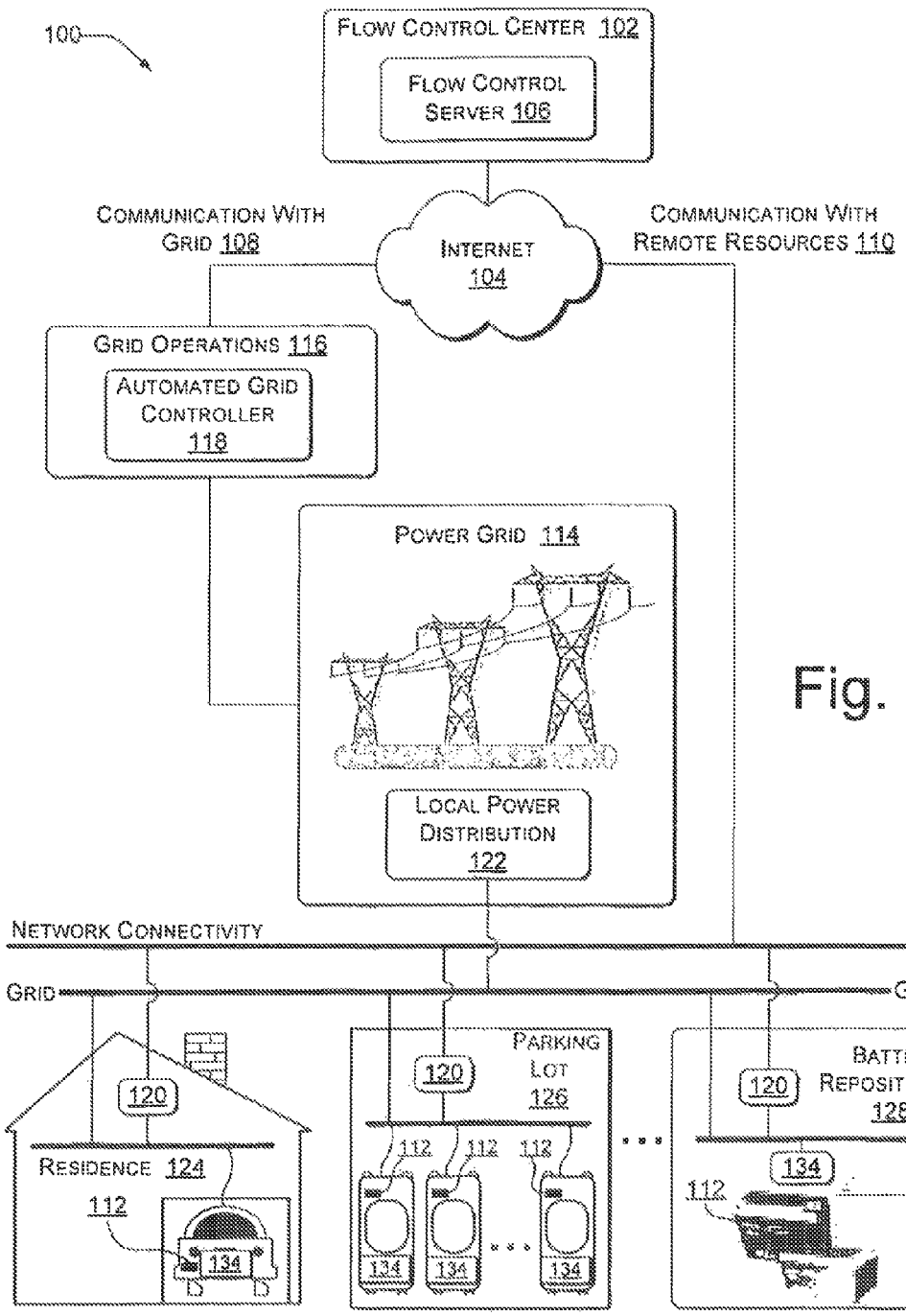
FIG. 1 is a diagram of an example of a power aggregation system.

Reference will now be made in detail to the embodiments of the present invention, examples of which are illustrated in the accompanying drawings.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

Overview

Described herein is a power aggregation system for distributed electric resources, and associated methods. In one implementation, a system communicates over the Internet and/or some other public or private networks with numerous individual electric resources connected to a power grid (hereinafter, "grid"). By communicating, the system can dynamically aggregate these electric resources to provide power services to grid operators (e.g. utilities, Independent System Operators (ISO), etc).

"Power services" as used herein, refers to energy delivery as well as other ancillary services including demand response, regulation, spinning reserves, non-spinning reserves, energy imbalance, reactive power, and similar products.

"Aggregation" as used herein refers to the ability to control power flows into and out of a set of spatially distributed electric resources with the purpose of providing a power service of larger magnitude.

"Charge Control Management" as used herein refers to enabling or performing the starting, stopping, or level-setting of a flow of power between a power grid and an electric resource.

"Power grid operator" as used herein, refers to the entity that is responsible for maintaining the operation and stability of the power grid within or across an electric control area. The power grid operator may constitute some combination of manual/human action/intervention and automated processes controlling generation signals in response to system sensors. A "control area operator" is one example of a power grid operator.

"Control area" as used herein, refers to a contained portion of the electrical grid with defined input and output ports. The net flow of power into this area must equal (within some error tolerance) the sum of the power consumption within the area and power outflow from the area.

"Power grid" as used herein means a power distribution system/network that connects producers of power with consumers of power. The network may include generators, transformers, interconnects, switching stations, and safety equipment as part of either/both the transmission system (i.e., bulk power) or the distribution system (i.e. retail power). The power aggregation system is vertically scalable for use within a neighborhood, a city, a sector, a control area, or (for example) one of the eight large-scale Interconnects in the North American Electric Reliability Council (NERC). Moreover, the system is horizontally scalable for use in providing power services to multiple grid areas simultaneously.

"Grid conditions" as used herein, refers to the need for more or less power flowing in or out of a section of the electric power grid, in response to one of a number of conditions, for example supply changes, demand changes, contingencies and failures, ramping events, etc. These grid conditions typically manifest themselves as power quality events such as under- or over-voltage events or under- or over-frequency events.

"Power quality events" as used herein typically refers to manifestations of power grid instability including voltage deviations and frequency deviations; additionally, power quality events as used herein also includes other disturbances in the quality of the power delivered by the power grid such as sub-cycle voltage spikes and harmonics.

"Electric resource" as used herein typically refers to electrical entities that can be commanded to do some or all of these three things: take power (act as load), provide power (act as power generation or source), and store energy. Examples may include battery/charger/inverter systems for electric or hybrid-electric vehicles, repositories of used-butserviceable electric vehicle batteries, fixed energy storage, fuel cell generators, emergency generators, controllable loads, etc.

"Electric vehicle" is used broadly herein to refer to pure electric and hybrid electric vehicles, such as plug-in hybrid electric vehicles (PHEVs), especially vehicles that have significant storage battery capacity and that connect to the power grid for recharging the battery. More specifically, electric vehicle means a vehicle that gets some or all of its energy for motion and other purposes from the power grid. Moreover, an electric vehicle has an energy storage system, which may consist of batteries, capacitors, etc., or some combination thereof. An electric vehicle may or may not have the capability to provide power back to the electric grid.

Electric vehicle "energy storage systems" (batteries, super capacitors, and/or other energy storage devices) are used herein as a representative example of electric resources intermittently or permanently connected to the grid that can have dynamic input and output of power. Such batteries can function as a power source or a power load. A collection of aggregated electric vehicle batteries can become a statistically stable resource across numerous batteries, despite recognizable tidal connection trends (e.g., an increase in the total number of vehicles connected to the grid at night; a downswing in the collective number of connected batteries as the morning commute begins, etc.) Across vast numbers of electric vehicle batteries, connection trends are predictable and such batteries become a stable and reliable resource to call upon, should the grid or a part of the grid (such as a person's home in a blackout) experience a need for increased or decreased power. Data collection and storage also enable the power aggregation system to predict connection behavior on a per-user basis.

An Example of the Presently Disclosed System

FIG. 1 shows a power aggregation system 100. A flow control center 102 is communicatively coupled with a network, such as a public/private mix that includes the Internet 104, and includes one or more servers 106 providing a centralized power aggregation service. "Internet" 104 will be used herein as representative of many different types of communicative networks and network mixtures (e.g., one or more wide area networks—public or private—and/or one or more local area networks). Via a network, such as the Internet 104, the flow control center 102 maintains communication 108 with operators of power grid(s), and communication 110 with remote resources, i.e., communication with peripheral electric resources 112 ("end" or "terminal" nodes/devices of a power network) that are connected to the power grid 114. In one implementation, power line communicators (PLCs), such as those that include or consist of Ethernet-over-power line bridges 120 are implemented at connection locations so that the "last mile" (in this case, last feet—e.g., in a residence 124) of Internet communication with remote resources is implemented over the same wire that connects each electric resource 112 to the power grid 114. Thus, each physical location of each electric resource 112 may be associated with a corresponding Ethernet-over-power line bridge 120 (hereinafter, "bridge") at or near the same location as the electric resource 112. Each bridge 120 is typically connected to an Internet access point of a location owner, as will be described in greater detail below. The communication medium from flow control center 102 to the connection location, such as residence 124, can take many forms, such as cable modem, DSL, satellite, fiber, WiMax, etc. In a variation, electric resources 112 may connect with the Internet by a different medium than the same power wire that connects them to the power grid 114. For example, a given electric resource 112 may have its own wireless capability to connect directly with the Internet 104 or an Internet access point and thereby with the flow control center 102.

Electric resources 112 of the power aggregation system 100 may include the batteries of electric vehicles connected to the power grid 114 at residences 124, parking lots 126 etc.; batteries in a repository 128, fuel cell generators, private dams, conventional power plants, and other resources that produce electricity and/or store electricity physically or electrically.

In one implementation, each participating electric resource 112 or group of local resources has a corresponding remote intelligent power flow (IPF) module 134 (hereinafter, "remote IPF module" 134). The centralized flow control center 102 administers the power aggregation system 100 by communicating with the remote IPF modules 134 distributed peripherally among the electric resources 112. The remote IPF modules 134 perform several different functions, including, but not limited to, providing the flow control center 102 with the statuses of remote resources; controlling the amount, direction, and timing of power being transferred into or out of a remote electric resource 112; providing metering of power being transferred into or out of a remote electric resource 112; providing safety measures during power transfer and changes of conditions in the power grid 114; logging activities; and providing self-contained control of power transfer and safety measures when communication with the flow control center 102 is interrupted. The remote IPF modules 134 will be described in greater detail below.

In another implementation, instead of having an IPF module 134, each electric resource 112 may have a corresponding transceiver (not shown) to communicate with a local charging component (not shown). The transceiver and charging component, in combination, may communicate with flow control center 102 to perform some or all of the above mentioned functions of IPF module 134. A transceiver and charging component are shown in FIG. 2B and are described in greater detail herein.

Figure 2A:
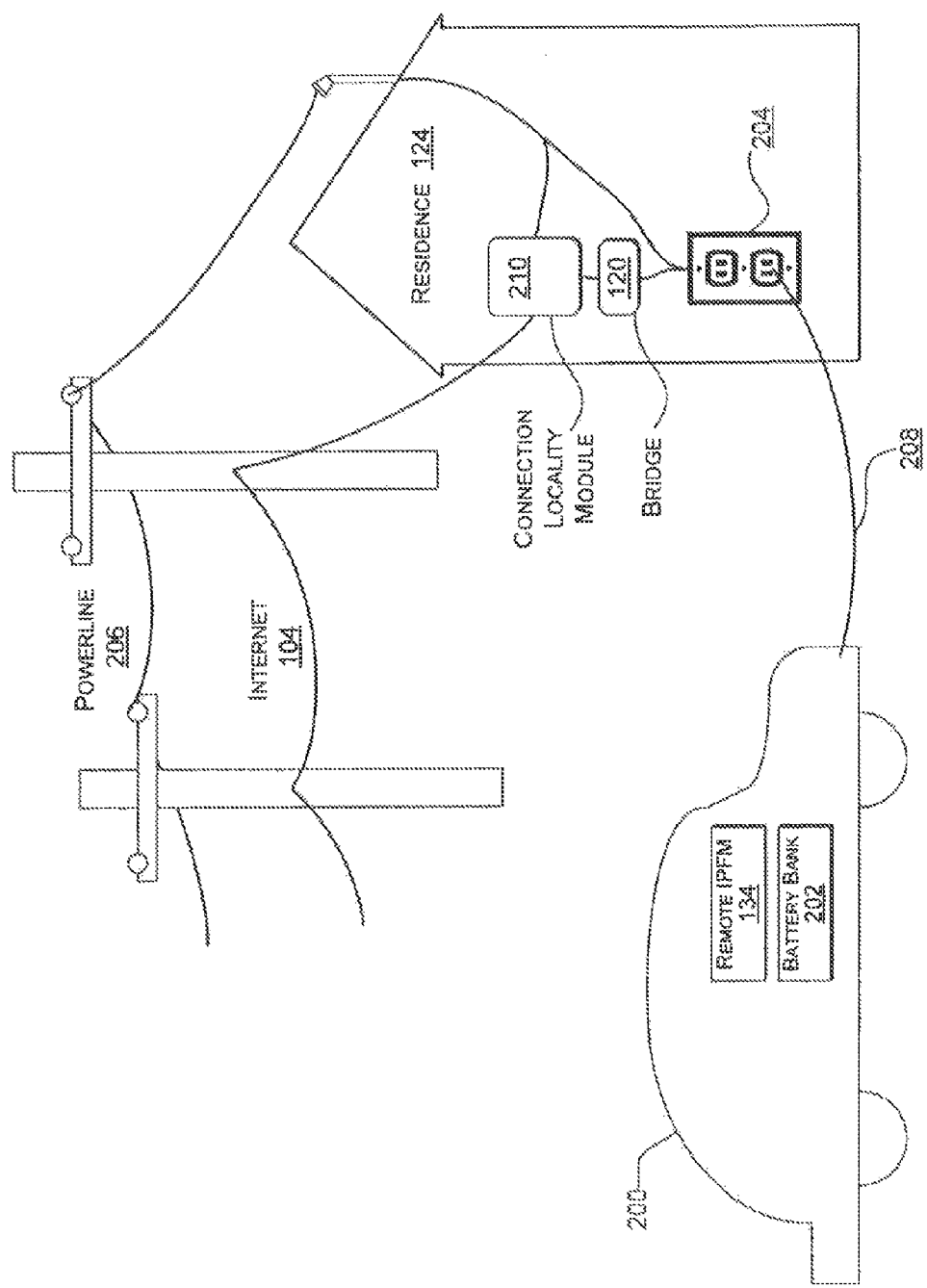
FIGS. 2A-2B are diagrams of an example of connections between an electric vehicle, the power grid, and the Internet.
Figure 2B:
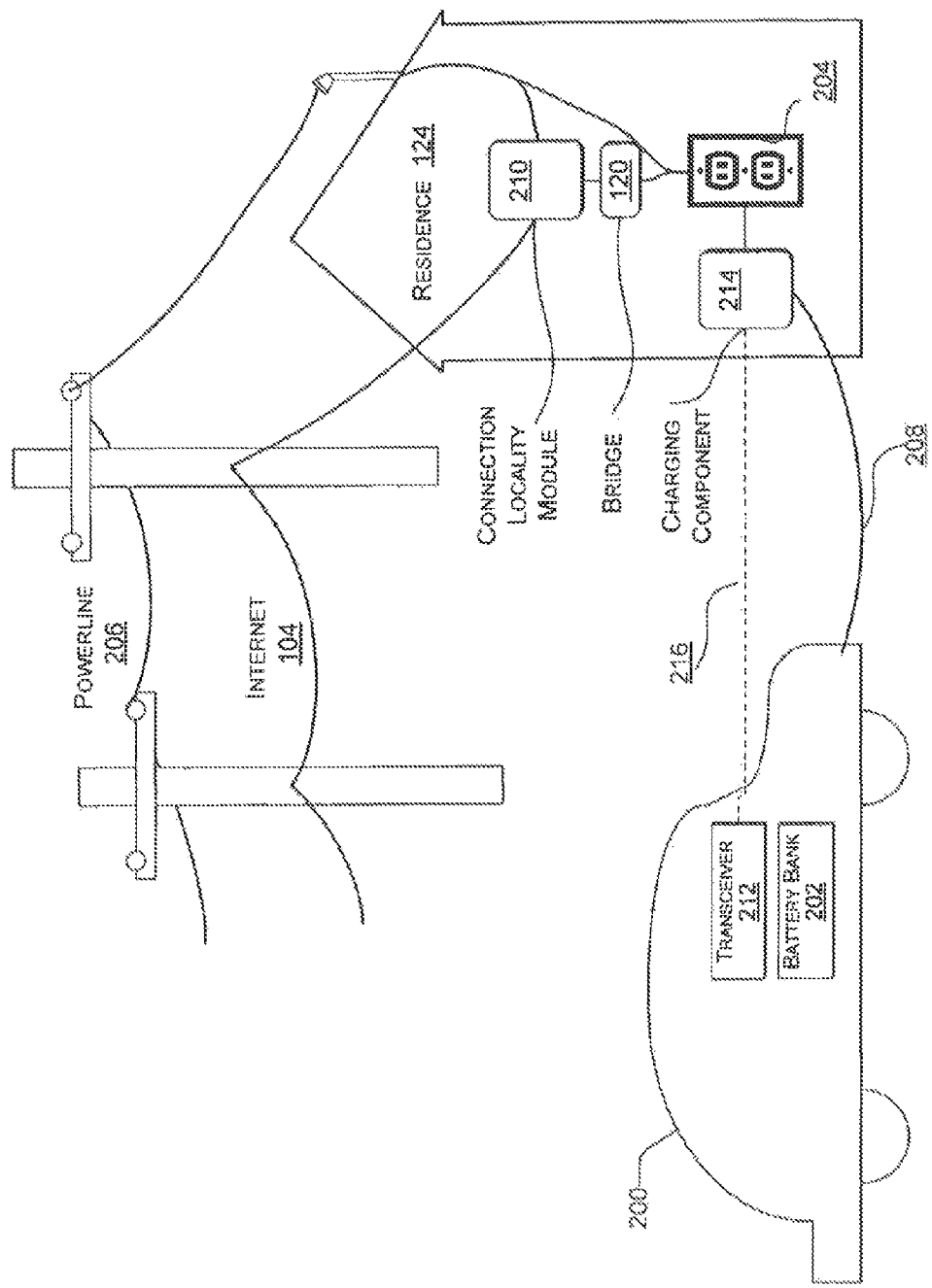

FIG. 2A shows another view of electrical and communicative connections to an electric resource 112. In this example, an electric vehicle 200 includes a battery bank 202 and a remote IPF module 134. The electric vehicle 200 may connect to a conventional wall receptacle (wall outlet) 204 of a residence 124, the wall receptacle 204 representing the peripheral edge of the power grid 114 connected via a residential powerline 206.

In one implementation, the power cord 208 between the electric vehicle 200 and the wall outlet 204 can be composed of only conventional wire and insulation for conducting alternating current (AC) power to and from the electric vehicle 200. In FIG. 2A, a location-specific connection locality module 210 performs the function of network access point—in this case, the Internet access point. A bridge 120 intervenes between the receptacle 204 and the network access point so that the power cord 208 can also carry network communications between the electric vehicle 200 and the receptacle 204. With such a bridge 120 and connection locality module 210 in place in a connection location, no other special wiring or physical medium is needed to communicate with the remote IPF module 134 of the electric vehicle 200 other than a conventional power cord 208 for providing residential line current at any conventional voltage. Upstream of the connection locality module 210, power and communication with the electric vehicle 200 are resolved into the powerline 206 and an Internet cable 104.

Alternatively, the power cord 208 may include safety features not found in conventional power and extension cords.

For example, an electrical plug 212 of the power cord 208 may include electrical and/or mechanical safeguard components to prevent the remote IPF module 134 from electrifying or exposing the male conductors of the power cord 208 when the conductors are exposed to a human user.

In some embodiments, a radio frequency (RF) bridge (not shown) may assist the remote IPF module 134 in communicating with a foreign system, such as a utility smart meter (not shown) and/or a connection locality module 210. For example, the remote IPF module 134 may be equipped to communicate over power cord 208 or to engage in some form of RF communication, such as Zigbee or Bluetooth™, and the foreign system may be able to engage in a different form of RF communication. In such an implementation, the RF bridge may be equipped to communicate with both the foreign system and remote IPF module 134 and to translate communications from one to a form the other may understand, and to relay those messages. In various embodiments, the RF bridge may be integrated into the remote IPF module 134 or foreign system, or may be external to both. The communicative associations between the RF bridge and remote IPF module 134 and between the RF bridge and foreign system may be via wired or wireless communication.

FIG. 2B shows a further view of electrical and communicative connections to an electric resource 112. In this example, the electric vehicle 200 may include a transceiver 212 rather than a remote IPF module 134. The transceiver 212 may be communicatively coupled to a charging component 214 through a connection 216, and the charging component itself may be coupled to a conventional wall receptacle (wall outlet) 204 of a residence 124 and to electric vehicle 200 through a power cord 208. The other components shown in FIG. 2B may have the couplings and functions discussed with regard to FIG. 2A.

In various embodiments, transceiver 212 and charging component 214 may, in combination, perform the same functions as the remote IPF module 134. Transceiver 212 may interface with computer systems of electric vehicle 200 and communicate with charging component 214, providing charging component 214 with information about electric vehicle 200, such as its vehicle identifier, a location identifier, and a state of charge. In response, transceiver 212 may receive requests and commands which transceiver 212 may relay to vehicle 200's computer systems.

Charging component 214, being coupled to both electric vehicle 200 and wall outlet 204, may effectuate charge control of the electric vehicle 200. If the electric vehicle 200 is not capable of charge control management, charging component 214 may directly manage the charging of electric vehicle 200 by stopping and starting a flow of power between the electric vehicle 200 and a power grid 114 in response to commands received from a flow control server 106. If, on the other hand, the electric vehicle 200 is capable of charge control management, charging component 214 may effectuate charge control by sending commands to the electric vehicle 200 through the transceiver 212.

In some embodiments, the transceiver 212 may be physically coupled to the electric vehicle 200 through a data port, such as an OBD-II connector. In other embodiments, other couplings may be used. The connection 216 between transceiver 212 and charging component 214 may be a wireless signal, such as a radio frequency (RF), such as a Zigbee, or Bluetooth™ signal. And charging component 214 may include a receiver socket to couple with power cord 208 and a plug to couple with wall outlet 204. In one embodiment, charging component 214 may be coupled to connection locality module 210 in either a wired or wireless fashion. For example, charging component 214 may have a data interface for communicating wirelessly with both the transceiver 212 and locality module 210. In such an embodiment, the bridge 120 may not be required.

Figure 8A:
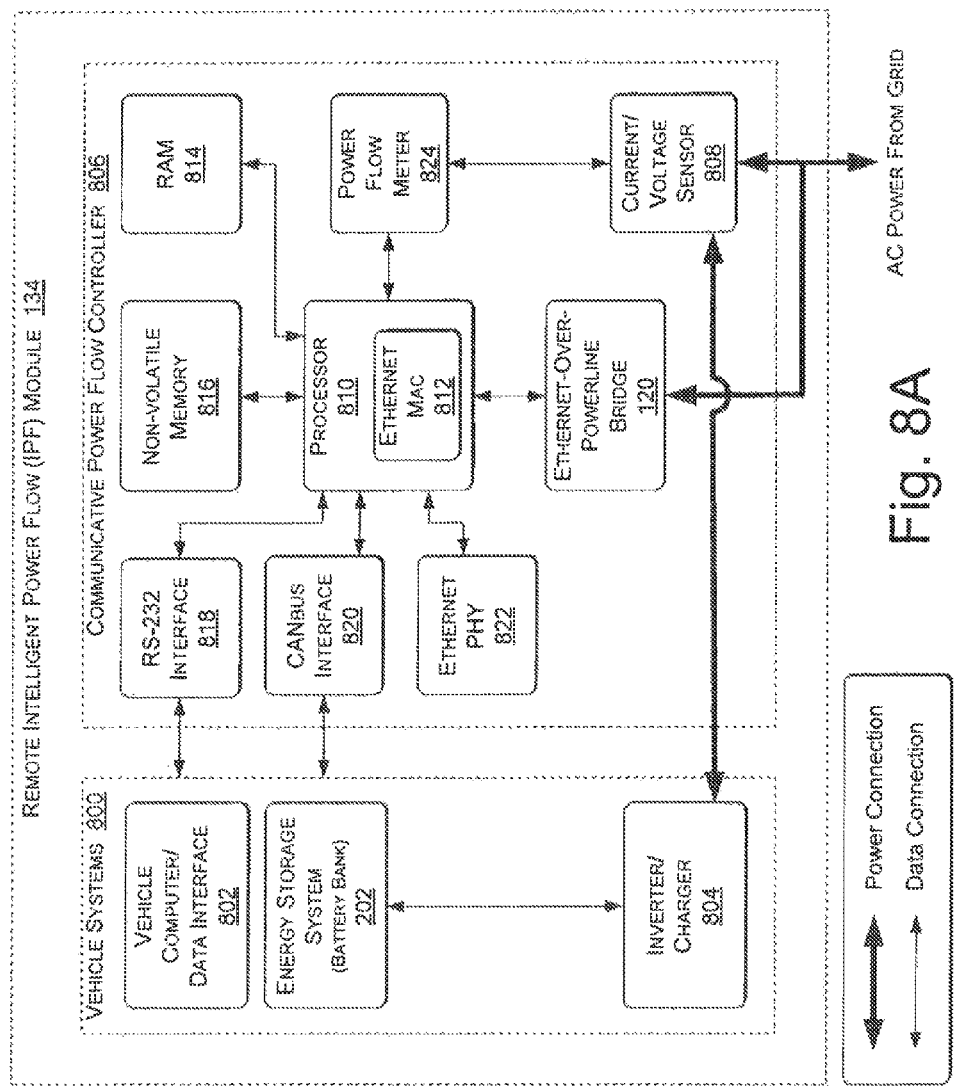
FIG. 8A is a block diagram of an example of remote intelligent power flow module.
Figure 8B:
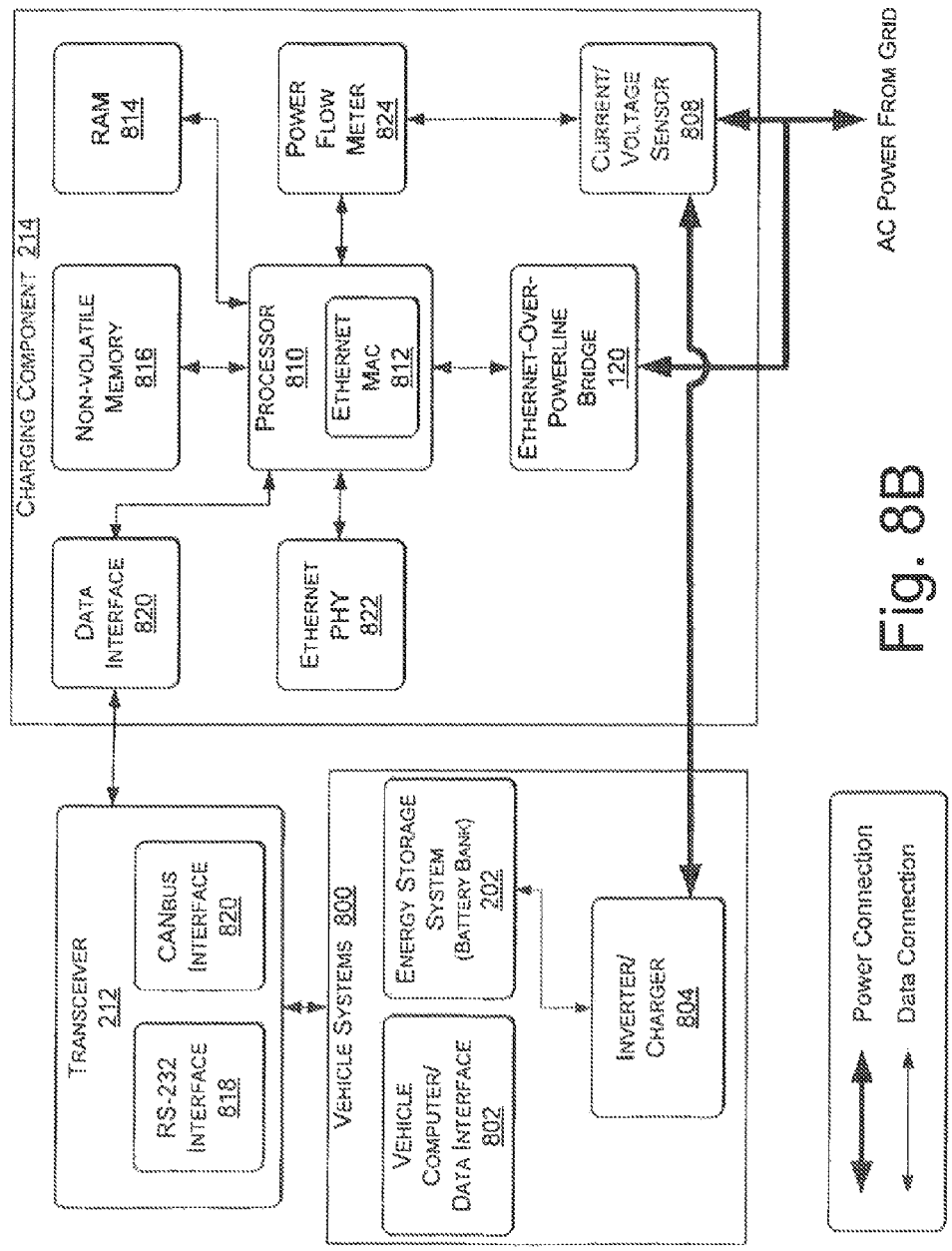
FIG. 8B is a block diagram of an example of transceiver and charging component combination.

Further details about the transceiver 212 and charging component 214 are illustrated by FIG. 8B and described in greater detail herein.

Figure 3:
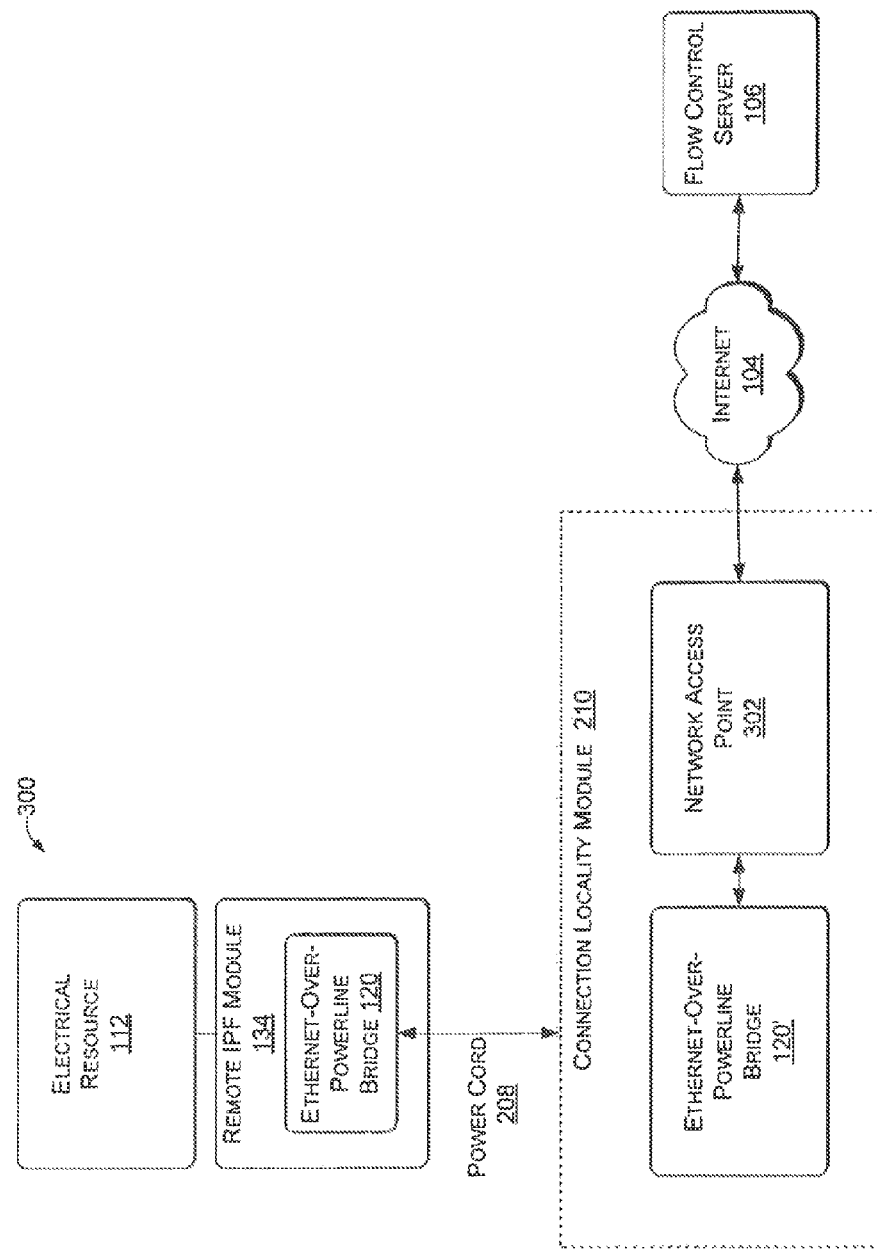
FIG. 3 is a block diagram of an example of connections between an electric resource and a flow control server of the power aggregation system.

FIG. 3 shows another implementation of the connection locality module 210 of FIG. 2, in greater detail. In FIG. 3, an electric resource 112 has an associated remote IPF module 134, including a bridge 120. The power cord 208 connects the electric resource 112 to the power grid 114 and also to the connection locality module 210 in order to communicate with the flow control server 106.

The connection locality module 210 includes another instance of a bridge 120, connected to a network access point 302, which may include such components as a router, switch, and/or modem, to establish a hardwired or wireless connection with, in this case, the Internet 104. In one implementation, the power cord 208 between the two bridges 120 and 120' is replaced by a wireless Internet link, such as a wireless transceiver in the remote IPF module 134 and a wireless router in the connection locality module 210.

In other embodiments, a transceiver 212 and charging component 214 may be used instead of a remote IPF module 134. In such an embodiment, the charging component 214 may include or be coupled to a bridge 120, and the connection locality module 210 may also include a bridge 120', as shown. In yet other embodiments, not shown, charging component 214 and connection locality module 210 may communicate in a wired or wireless fashion, as mentioned previously, without bridges 120 and 120'. The wired or wireless communication may utilize any sort of connection technology known in the art, such as Ethernet or RF communication, such as Zigbee, or Bluetooth.

System Layouts

Figure 4:
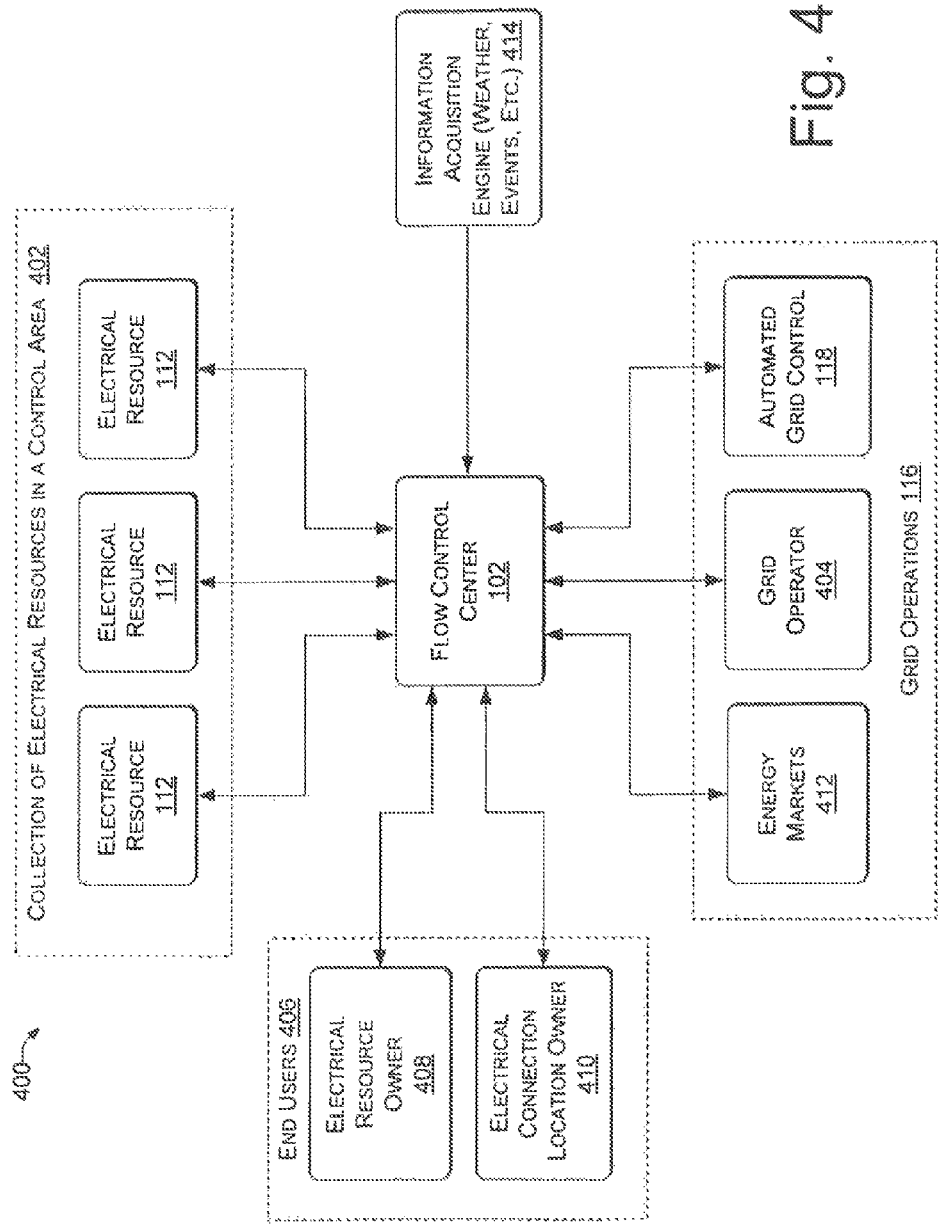
FIG. 4 is a diagram of an example of a layout of the power aggregation system.

FIG. 4 shows a layout 400 of the power aggregation system 100. The flow control center 102 can be connected to many different entities, e.g., via the Internet 104, for communicating and receiving information. The layout 400 includes electric resources 112, such as plug-in electric vehicles 200, physically connected to the grid within a single control area 402. The electric resources 112 become an energy resource for grid operators 404 to utilize.

The layout 400 also includes end users 406 classified into electric resource owners 408 and electrical connection location owners 410, who may or may not be one and the same. In fact, the stakeholders in a power aggregation system 100 include the system operator at the flow control center 102, the grid operator 404, the resource owner 408, and the owner of the location 410 at which the electric resource 112 is connected to the power grid 114.

Electrical connection location owners 410 can include:

Rental car lots—rental car companies often have a large portion of their fleet parked in the lot. They can purchase fleets of electric vehicles 200 and, participating in a power aggregation system 100, generate revenue from idle fleet vehicles.

Public parking lots—parking lot owners can participate in the power aggregation system 100 to generate revenue from parked electric vehicles 200. Vehicle owners can be offered free parking, or additional incentives, in exchange for providing power services.

Workplace parking—employers can participate in a power aggregation system 100 to generate revenue from parked employee electric vehicles 200. Employees can be offered incentives in exchange for providing power services.

Residences—a home garage can merely be equipped with a connection locality module 210 to enable the homeowner to participate in the power aggregation system 100 and generate revenue from a parked car. Also, the vehicle battery 202 and associated power electronics within the vehicle can provide local power backup power during times of peak load or power outages.

Residential neighborhoods—neighborhoods can participate in a power aggregation system 100 and be equipped with power-delivery devices (deployed, for example, by homeowner cooperative groups) that generate revenue from parked electric vehicles 200.

The grid operations 116 of FIG. 4 collectively include interactions with energy markets 412, the interactions of grid operators 404, and the interactions of automated grid controllers 118 that perform automatic physical control of the power grid 114.

The flow control center 102 may also be coupled with information sources 414 for input of weather reports, events, price feeds, etc. Other data sources 414 include the system stakeholders, public databases, and historical system data, which may be used to optimize system performance and to satisfy constraints on the power aggregation system 100.

Thus, a power aggregation system 100 may consist of components that:

communicate with the electric resources 112 to gather data and actuate charging/discharging of the electric resources 112;

gather real-time energy prices;

gather real-time resource statistics;

predict behavior of electric resources 112 (connectedness, location, state (such as battery State-Of-Charge) at a given time of interest, such as a time of connect/disconnect);

predict behavior of the power grid 114/load;

encrypt communications for privacy and data security;

actuate charging of electric vehicles 200 to optimize some figure(s) of merit;

offer guidelines or guarantees about load availability for various points in the future, etc.

These components can be running on a single computing resource (computer, etc.), or on a distributed set of resources (either physically co-located or not).

Power aggregation systems 100 in such a layout 400 can provide many benefits: for example, lower-cost ancillary services (i.e., power services), fine-grained (both temporal and spatial) control over resource scheduling, guaranteed reliability and service levels, increased service levels via intelligent resource scheduling, and/or firming of intermittent generation sources such as wind and solar power generation.

The power aggregation system 100 enables a grid operator 404 to control the aggregated electric resources 112 connected to the power grid 114. An electric resource 112 can act as a power source, load, or storage, and the resource 112 may exhibit combinations of these properties. Control of a set of electric resources 112 is the ability to actuate power consumption, generation, or energy storage from an aggregate of these electric resources 112.

Figure 5:
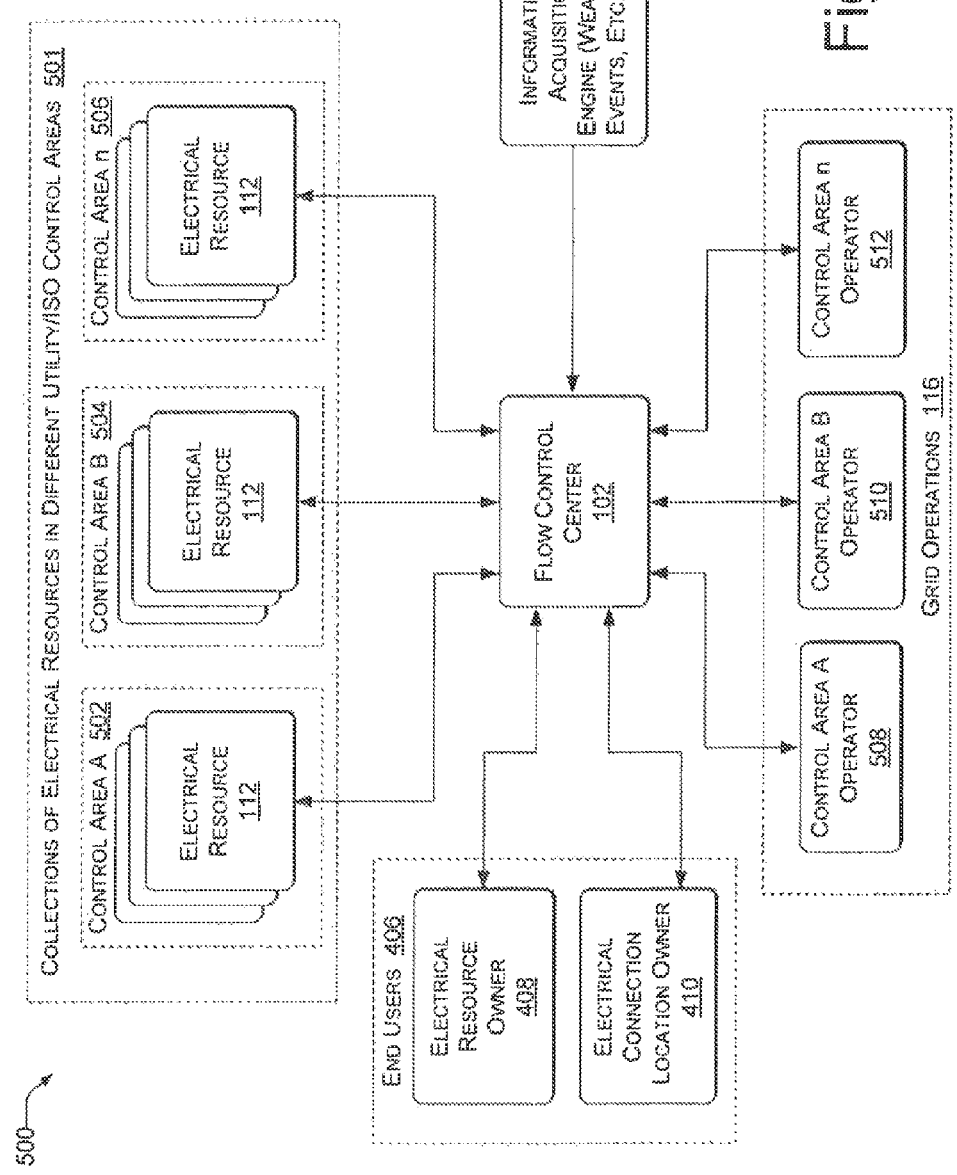
FIG. 5 is a diagram of an example of control areas in the power aggregation system.

FIG. 5 shows the role of multiple control areas 402 in the power aggregation system 100. Each electric resource 112 can be connected to the power aggregation system 100 within a specific electrical control area. A single instance of the flow control center 102 can administer electric resources 112 from multiple distinct control areas 501 (e.g., control areas 502, 504, and 506). In one implementation, this functionality is achieved by logically partitioning resources within the power aggregation system 100. For example, when the control areas 402 include an arbitrary number of control areas, control area "A" 502, control area "B" 504, . . . , control area "n" 506, then grid operations 116 can include corresponding control area operators 508, 510, . . . , and 512. Further division into a control hierarchy that includes control division groupings above and below the illustrated control areas 402 allows the power aggregation system 100 to scale to power grids 114 of different magnitudes and/or to varying numbers of electric resources 112 connected with a power grid 114.

Figure 6:
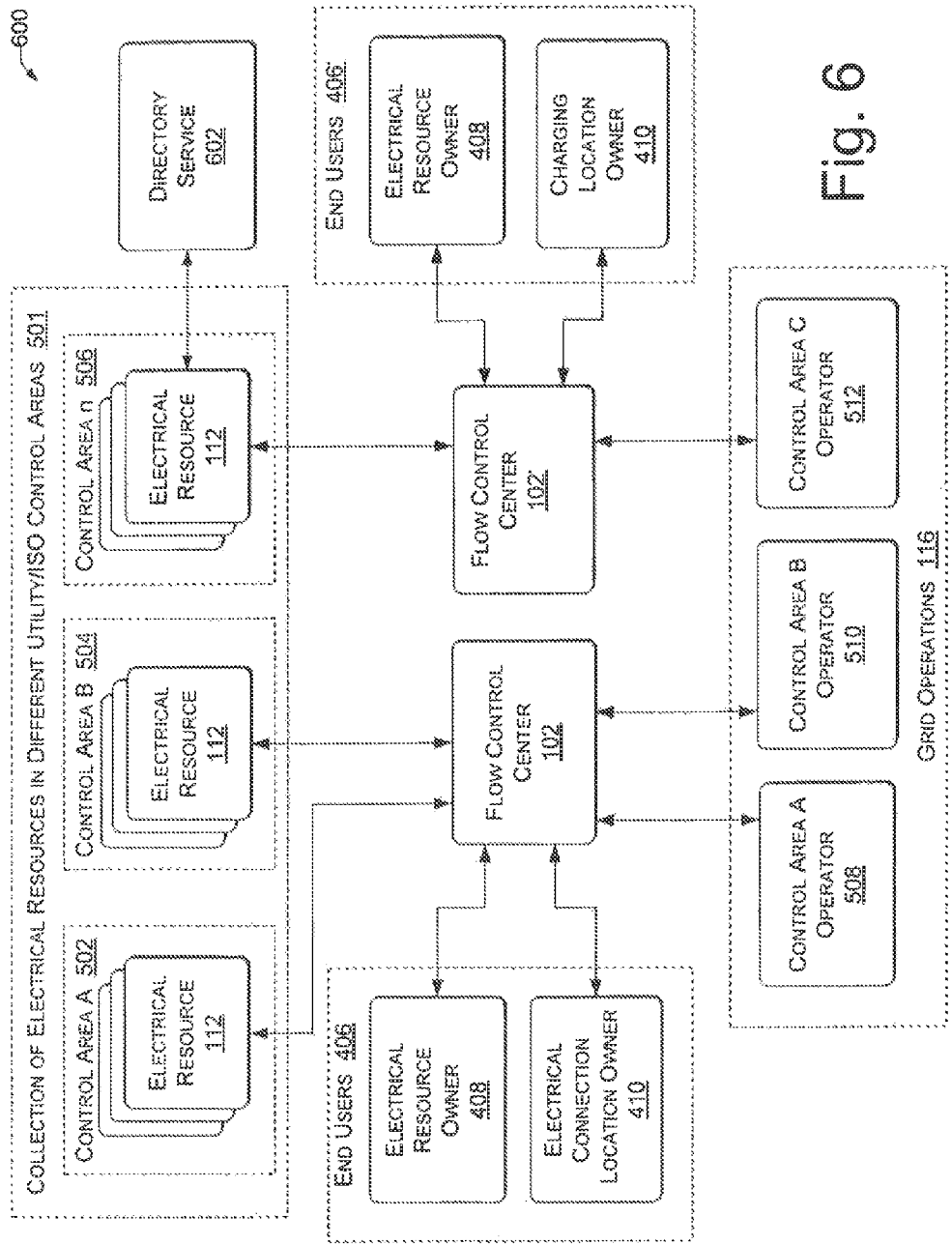
FIG. 6 is a diagram of multiple flow control centers in the power aggregation system and a directory server for determining a flow control center.

FIG. 6 shows a layout 600 of a power aggregation system 100 that uses multiple centralized flow control centers 102 and 102' and a directory server 602 for determining a flow control center. Each flow control center 102 and 102' has its own respective end users 406 and 406'. Control areas 402 to be administered by each specific instance of a flow control center 102 can be assigned dynamically. For example, a first flow control center 102 may administer control area A 502 and control area B 504, while a second flow control center 102' administers control area n 506. Likewise, corresponding control area operators (508, 510, and 512) are served by the same flow control center 102 that serves their respective different control areas.

In various embodiments, an electric resource may determine which flow control center 102/102' administers its control area 502/504/506 by communicating with a directory server 602. The address of the directory server 602 may be known to electric resource 112 or its associated IPF module 134 or charging component 214. Upon plugging in, the electric resource 112 may communicate with the directory server 602, providing the directory server 112 with a resource identifier and/or a location identifier. Based on this information, the directory server 602 may respond, identifying which flow control center 102/102' to use.

In another embodiment, directory server 602 may be integrated with a flow control server 106 of a flow control center 102/102'. In such an embodiment, the electric resource 112 may contact the server 106. In response, the server 106 may either interact with the electric resource 112 itself or forward the connection to another flow control center 102/102' responsible for the location identifier provided by the electric resource 112.

In some embodiments, whether integrated with a flow control server 106 or not, directory server 602 may include a publicly accessible database for mapping locations to flow control centers 102/102'.

Flow Control Server

Figure 7:
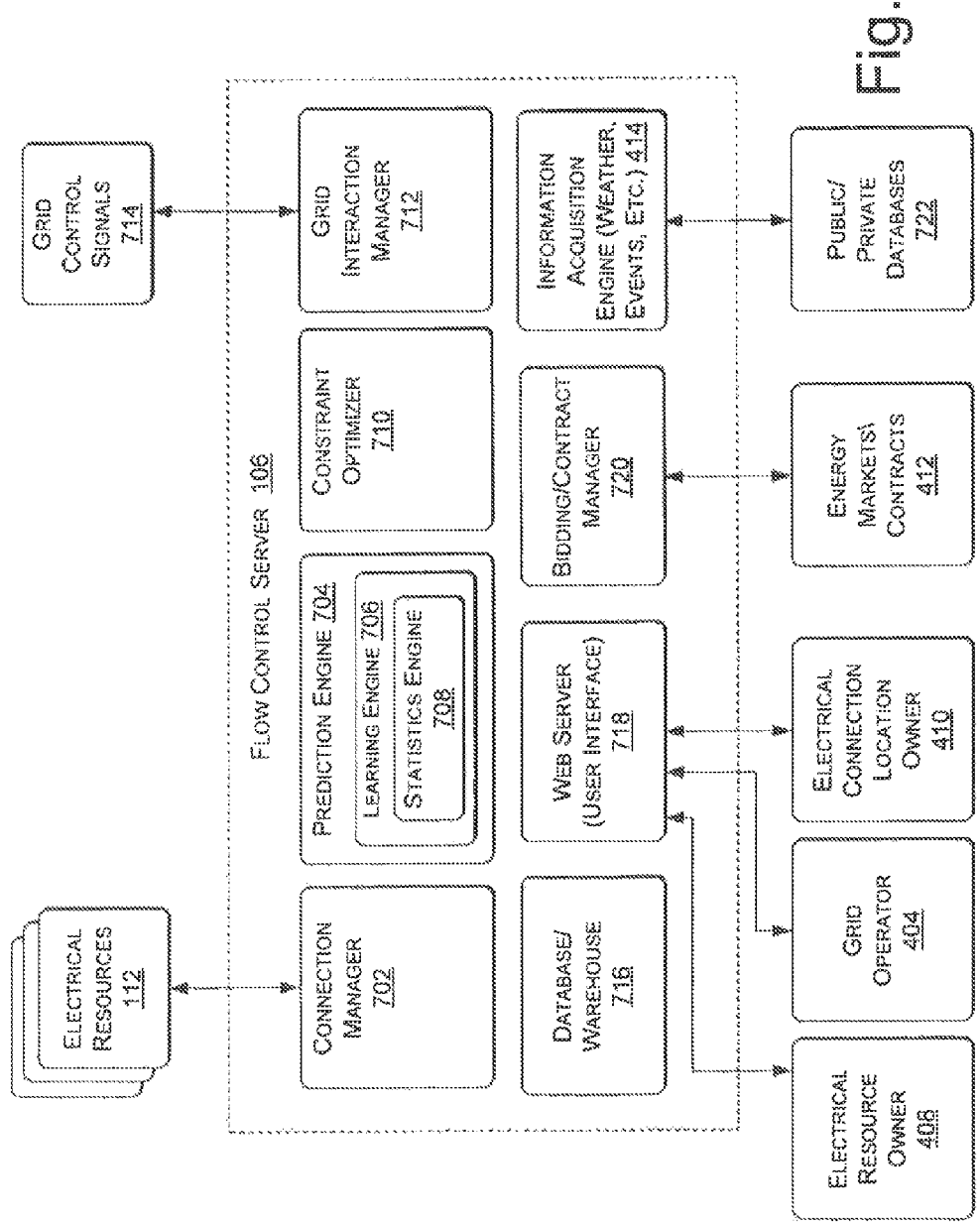
FIG. 7 is a block diagram of an example of flow control server.

FIG. 7 shows a server 106 of the flow control center 102. The illustrated implementation in FIG. 7 is only one example configuration, for descriptive purposes. Many other arrangements of the illustrated components or even different components constituting a server 106 of the flow control center 102 are possible within the scope of the subject matter. Such a server 106 and flow control center 102 can be executed in hardware, software, or combinations of hardware, software, firmware, etc.

The flow control server 106 includes a connection manager 702 to communicate with electric resources 112, a prediction engine 704 that may include a learning engine 706 and a statistics engine 708, a constraint optimizer 710, and a grid interaction manager 712 to receive grid control signals 714. Grid control signals 714 are sometimes referred to as generation control signals, such as automated generation control (AGC) signals. The flow control server 106 may further include a database/information warehouse 716, a web server 718 to present a user interface to electric resource owners 408, grid operators 404, and electrical connection location owners 410; a contract manager 720 to negotiate contract terms with energy markets 412, and an information acquisition engine 414 to track weather, relevant news events, etc., and download information from public and private databases 722 for predicting behavior of large groups of the electric resources 112, monitoring energy prices, negotiating contracts, etc.

Remote IPF Module

FIG. 8A shows the remote IPF module 134 of FIGS. 1 and 2 in greater detail. The illustrated remote IPF module 134 is only one example configuration, for descriptive purposes. Many other arrangements of the illustrated components or even different components constituting a remote IPF module 134 are possible within the scope of the subject matter. Such a remote IPF module 134 has some hardware components and some components that can be executed in hardware, software, or combinations of hardware, software, firmware, etc. In other embodiments, executable instructions configured to perform some or all of the operations of remote IPF module 134 may be added to hardware of an electric resource 112 such as an electric vehicle that, when combined with the executable instructions, provides equivalent functionality to remote IPF module 134. References to remote IPF module 134 as used herein include such executable instructions.

The illustrated example of a remote IPF module 134 is represented by an implementation suited for an electric vehicle 200. Thus, some vehicle systems 800 are included as part of the remote IPF module 134 for the sake of description. However, in other implementations, the remote IPF module 134 may exclude some or all of the vehicles systems 800 from being counted as components of the remote IPF module 134.

The depicted vehicle systems 800 include a vehicle computer and data interface 802, an energy storage system, such as a battery bank 202, and an inverter/charger 804. Besides vehicle systems 800, the remote IPF module 134 also includes a communicative power flow controller 806. The communicative power flow controller 806 in turn includes some components that interface with AC power from the grid 114, such as a powerline communicator, for example an Ethernet-over-powerline bridge 120, and a current or current/voltage (power) sensor 808, such as a current sensing transformer.

The communicative power flow controller 806 also includes Ethernet and information processing components, such as a processor 810 or microcontroller and an associated Ethernet media access control (MAC) address 812; volatile random access memory 814, nonvolatile memory 816 or data storage, an interface such as an RS-232 interface 818 or a CAN-bus interface 820; an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The communicative power flow controller 806 also includes a bidirectional power flow meter 824 that tracks power transfer to and from each electric resource 112, in this case the battery bank 202 of an electric vehicle 200.

The communicative power flow controller 806 operates either within, or connected to an electric vehicle 200 or other electric resource 112 to enable the aggregation of electric resources 112 introduced above (e.g., via a wired or wireless communication interface). These above-listed components may vary among different implementations of the communicative power flow controller 806, but implementations typically include:

an intra-vehicle communications mechanism that enables communication with other vehicle components;
a mechanism to communicate with the flow control center 102;
a processing element;
a data storage element;
a power meter; and
optionally, a user interface.

Implementations of the communicative power flow controller 806 can enable functionality including:

executing pre-programmed or learned behaviors when the electric resource 112 is offline (not connected to Internet 104, or service is unavailable);
storing locally-cached behavior profiles for "roaming" connectivity (what to do when charging on a foreign system, i.e., when charging in the same utility territory on a foreign meter or in a separate utility territory, or in disconnected operation, i.e., when there is no network connectivity);
allowing the user to override current system behavior; and
metering power-flow information and caching meter data during offline operation for later transaction.

Thus, the communicative power flow controller 806 includes a central processor 810, interfaces 818 and 820 for communication within the electric vehicle 200, a powerline communicator, such as an Ethernet-over-powerline bridge 120 for communication external to the electric vehicle 200, and a power flow meter 824 for measuring energy flow to and from the electric vehicle 200 via a connected AC powerline 208.

Power Flow Meter

Power is the rate of energy consumption per interval of time. Power indicates the quantity of energy transferred during a certain period of time, thus the units of power are quantities of energy per unit of time. The power flow meter 824 measures power for a given electric resource 112 across a bidirectional flow—e.g., power from grid 114 to electric vehicle 200 or from electric vehicle 200 to the grid 114. In one implementation, the remote IPF module 134 can locally cache readings from the power flow meter 824 to ensure accurate transactions with the central flow control server 106, even if the connection to the server is down temporarily, or if the server itself is unavailable.

Transceiver and Charging Component

FIG. 8B shows the transceiver 212 and charging component 214 of FIG. 2B in greater detail. The illustrated transceiver 212 and charging component 214 is only one example configuration, for descriptive purposes. Many other arrangements of the illustrated components or even different components constituting the transceiver 212 and charging component 214 are possible within the scope of the subject matter. Such a transceiver 212 and charging component 214 have some hardware components and some components that can be executed in hardware, software, or combinations of hardware, software, firmware, etc.

The illustrated example of the transceiver 212 and charging component 214 is represented by an implementation suited for an electric vehicle 200. Thus, some vehicle systems 800 are illustrated to provide context to the transceiver 212 and charging component 214 components.

The depicted vehicle systems 800 include a vehicle computer and data interface 802, an energy storage system, such as a battery bank 202, and an inverter/charger 804. In some embodiments, vehicle systems 800 may include a data port, such as an OBD-II port, that is capable of physically coupling with the transceiver 212. The transceiver 212 may then communicate with the vehicle computer and data interface 802 through the data port, receiving information from electric resource 112 comprised by vehicle systems 800 and, in some embodiments, providing commands to the vehicle computer and data interface 802. In one implementation, the vehicle computer and data interface 802 may be capable of charge control management. In such an embodiment, the vehicle computer and data interface 802 may perform some or all of the charging component 214 operations discussed below. In other embodiments, executable instructions configured to perform some or all of the operations of the vehicle computer and data interface 802 may be added to hardware of an electric resource 112 such as an electric vehicle that, when combined with the executable instructions, provides equivalent functionality to the vehicle computer and data interface 802. References to the vehicle computer and data interface 802 as used herein include such executable instructions.

In various embodiments, the transceiver 212 may have a physical form that is capable of coupling to a data port of vehicle systems 800. Such a transceiver 212 may also include a plurality of interfaces, such as an RS-232 interface 818 and/or a CAN-bus interface 820. In various embodiments, the RS-232 interface 818 or CAN-bus interface 820 may enable the transceiver 212 to communicate with the vehicle computer and data interface 802 through the data port. Also, the transceiver may be or comprise an additional interface (not shown) capable of engaging in wireless communication with a data interface 820 of the charging component 214. The wireless communication may be of any form known in the art, such as radio frequency (RF) communication (e.g., Zigbee, and/or Bluetooth™ communication). In other embodiments, the transceiver may comprise a separate conductor or may be configured to utilize a powerline 208 to communicate with charging component 214. In yet other embodiments, not shown, transceiver 212 may simply be a radio frequency identification (RFID) tag capable of storing minimal information about the electric resource 112, such as a resource identifier, and of being read by a corresponding RFID reader of charging component 214. In such other embodiments, the RFID tag may not couple with a data port or communicate with the vehicle computer and data interface 802.

As shown, the charging component 214 may be an intelligent plug device that is physically connected to a charging medium, such as a powerline 208 (the charging medium coupling the charging component 214 to the electric resource 112) and an outlet of a power grid (such as the wall outlet 204 shown in FIG. 2B). In other embodiments charging component 214 may be a charging station or some other external control. In some embodiments, the charging component 214 may be portable.

In various embodiments, the charging component 214 may include components that interface with AC power from the grid 114, such as a powerline communicator, for example an Ethernet-over-powerline bridge 120, and a current or current/voltage (power) sensor 808, such as a current sensing transformer.

In other embodiments, the charging component 214 may include a further Ethernet plug or wireless interface in place of bridge 120. In such an embodiment, data-over-powerline communication is not necessary, eliminating the need for a bridge 120. The Ethernet plug or wireless interface may communicate with a local access point, and through that access point to flow control server 106.

The charging component 214 may also include Ethernet and information processing components, such as a processor 810 or microcontroller and an associated Ethernet media access control (MAC) address 812; volatile random access memory 814, nonvolatile memory 816 or data storage, a data interface 820 for communicating with the transceiver 212, and an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The charging component 214 may also include a bidirectional power flow meter 824 that tracks power transfer to and from each electric resource 112, in this case the battery bank 202 of an electric vehicle 200.

Further, in some embodiments, the charging component 214 may comprise an RFID reader to read the electric resource information from transceiver 212 when transceiver 212 is an RFID tag.

Also, in various embodiments, the charging component 214 may include a credit card reader to enable a user to identify the electric resource 112 by providing credit card information. In such an embodiment, a transceiver 212 may not be necessary.

Additionally, in one embodiment, the charging component 214 may include a user interface, such as one of the user interfaces described in greater detail below.

Implementations of the charging component 214 can enable functionality including:
  executing pre-programmed or learned behaviors when the electric resource 112 is offline (not connected to Internet 104, or service is unavailable);
  storing locally-cached behavior profiles for "roaming" connectivity (what to do when charging on a foreign system or in disconnected operation, i.e., when there is no network connectivity);
  allowing the user to override current system behavior; and
  metering power-flow information and caching meter data during offline operation for later transaction.

User Interfaces (UI)

Charging Station UI. An electrical charging station, whether free or for pay, can be installed with a user interface that presents useful information to the user. Specifically, by collecting information about the grid 114, the electric resource state, and the preferences of the user, the station can present information such as the current electricity price, the estimated recharge cost, the estimated time until recharge, the estimated payment for uploading power to the grid 114 (either total or per hour), etc. The information acquisition engine 414 communicates with the electric resource 112 and with public and/or private data networks 722 to acquire the data used in calculating this information.

The types of information gathered from the electric resource 112 can include an electric resource identifier (resource ID) and state information like the state of charge of the electric resource 112. The resource ID can be used to obtain knowledge of the electric resource type and capabilities, preferences, etc. through lookup with the flow control server 106.

In various embodiments, the charging station system including the UI may also gather grid-based information, such as current and future energy costs at the charging station.

User Charge Control UI Mechanisms. In various embodiments, by default, electric resources 112 may receive charge control management via power aggregation system 100. In some embodiments, an override control may be provided to override charge control management and charge as soon as possible. The override control may be provided, in various embodiments, as a user interface mechanism of the remote IPF module 134, the charging component 214, of the electric resource (for example, if electric resource is a vehicle 200, the user interface control may be integrated with dash controls of the vehicle 200) or even via a web page offered by flow control server 106. The control can be presented, for example, as a button, a touch screen option, a web page, or some other UI mechanism. In one embodiment, the UI may be the UI illustrated by FIG. 8C and discussed in greater detail below. In some embodiments, the override is a one-time override, only applying to a single plug-in session. Upon disconnecting and reconnecting, the user may again need to interact with the UI mechanism to override the charge control management.

In some embodiments, the user may pay more to charge with the override on than under charge control management, thus providing an incentive for the user to accept charge control management. Such a cost differential may be displayed or rendered to the user in conjunction with or on the UI mechanism. This differential can take into account time-varying pricing, such as Time of Use (TOU), Critical Peak Pricing (CPP), and Real-Time Pricing (RTP) schemes, as discussed above, as well as any other incentives, discounts, or payments that may be forgone by not accepting charge control management.

UI Mechanism for Management Preferences. In various embodiments, a user interface mechanism of the remote IPF module 134, the charging component 214, of the electric resource (for example, if electric resource is a vehicle 200, the user interface control may be integrated with dash controls of the vehicle 200) or even via a web page offered by flow control server 106 may enable a user to enter and/or edit management preferences to affect charge control management of the user's electric resource 112. In some embodiments, the UI mechanism may allow the user to enter/edit general preferences, such as whether charge control management is enabled, whether vehicle-to-grid power flow is enabled or whether the electric resource 112 should only be charged with clean/green power. Also, in various embodiments, the UI mechanism may enable a user to prioritize relative desires for minimizing costs, maximizing payments (i.e., fewer charge periods for higher amounts), achieving a full state-of-charge for the electric resource 112, charging as rapidly as possible, and/or charging in as environmentally-friendly a way as possible. Additionally, the UI mechanism may enable a user to provide a default schedule for when the electric resource will be used (for example, if resource 112 is a vehicle 200, the schedule is for when the vehicle 200 should be ready to drive). Further, the UI mechanism may enable the user to add or select special rules, such as a rule not to charge if a price threshold is exceeded or a rule to only use charge control management if it will earn the user at least a specified threshold of output. Charge control management may then be effectuated based on any part or all of these user entered preferences.

Simple User Interface. FIG. 8C illustrates a simple user interface (UI) which enables a user to control charging based on selecting among a limited number of high level preferences. For example, UI 2300 includes the categories "green", "fast", and "cheap" (with what is considered "green", "fast", and "cheap" varying from embodiment to embodiment). The categories shown in UI 2300 are selected only for the sake of illustration and may instead includes these and/or any other categories applicable to electric resource 112 charging known in the art. As shown, the UI 2300 may be very basic, using well known form controls such as radio buttons. In other embodiments, other graphic controls known in the art may be used. The general categories may be mapped to specific charging behaviors, such as those discussed above, by a flow control server 106.

Electric Resource Communication Protocol

Figure 9:
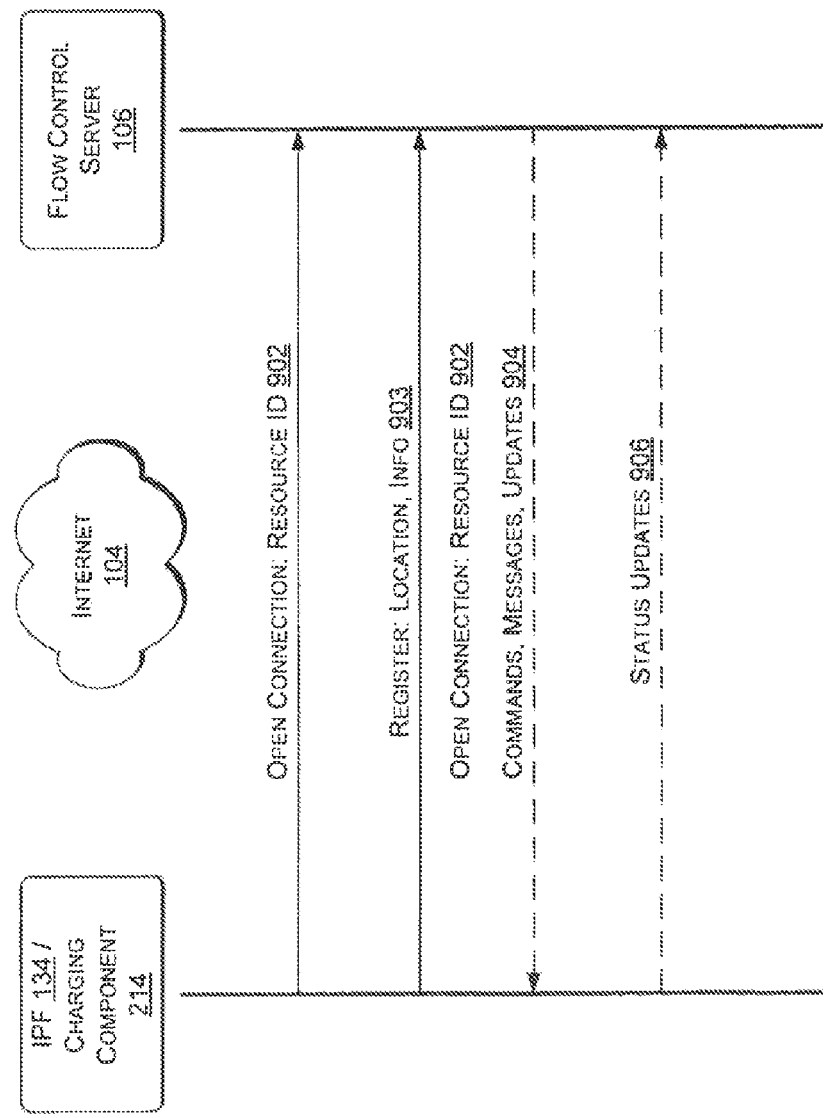
FIG. 9 is a diagram of an example of resource communication protocol.

FIG. 9 illustrates a resource communication protocol. As shown, a remote IPF module 134 or charging component 214 may be in communication with a flow control server 106 over the Internet 104 or another networking fabric or combination of networking fabrics. In various embodiments, a protocol specifying an order of messages and/or a format for messages may be used to govern the communications between the remote IPF module 134 or charging component 214 and flow control server 106.

In some embodiments, the protocol may include two channels, one for messages initiated by the remote IPF module 134 or charging component 214 and for replies to those messages from the flow control server 106, and another channel for messages initiated by the flow control server 106 and for replies to those messages from the remote IPF module 134 or charging component 214. The channels may be asynchronous with respect to each other (that is, initiation of messages on one channel may be entirely independent of initiation of messages on the other channel). However, each channel may itself be synchronous (that is, once a message is sent on a channel, another message may not be sent until a reply to the first message is received).

As shown, the remote IPF module 134 or charging component 214 may initiate communication 902 with the flow control server 106. In some embodiments, communication 902 may be initiated when, for example, an electric resource 112 first plugs in/connects to the power grid 114. In other embodiments, communication 902 may be initiated at another time or times. The initial message 902 governed by the protocol may require, for example, one or more of an electric resource identifier, such as a MAC address, a protocol version used, and/or a resource identifier type.

Upon receipt of the initial message by the flow control server 106, a connection may be established between the remote IPF module 134 or charging component 214 and flow control server 106. Upon establishing a connection, the remote IPF module 134 or charging component 214 may register with flow control server 106 through a subsequent communication 903. Communication 903 may include a location identifier scheme, a latitude, a longitude, a max power value that the remote IPF module 134 or charging component 214 can draw, a max power value that the remote IPF module 134 or charging component 214 can provide, a current power value, and/or a current state of charge.

After the initial message 902, the protocol may require or allow messages 904 from the flow control server 106 to the remote IPF module 134 or charging component 214 or messages 906 from remote IPF module 134 or charging component 214 to the flow control server 106. The messages 904 may include, for example, one or more of commands, messages, and/or updates. Such messages 904 may be provided at any time after the initial message 902. In one embodiment, messages 904 may include a command setting, a power level and/or a ping to determine whether the remote IPF module 134 or charging component 214 is still connected.

The messages 906 may include, for example, status updates to the information provided in the registration message 903. Such messages 906 may be provided at any time after the initial message 902. In one embodiment, the messages 906 may be provided on a pre-determined time interval basis. In various embodiments, messages 906 may even be sent when the remote IPF module 134 or charging component 214 is connected, but not registered. Such messages 906 may include data that is stored by flow control server 106 for later processing. Also, in some embodiments, messages 904 may be provided in response to a message 902 or 906.

Accurate System Metering Via Statistical Averaging

Metering information for an aggregate power system from the endpoints requires a meter at each endpoint. A potential cost reduction for such system is to reduce the accuracy of each individual meter. Building a model for the meter error for each type of meter in a system provides an upper bound on system accuracy. Any bias, or offset from zero, can be removed from the system level calculation by utilizing such a model. Additionally, the standard deviation of the meter error can be characterized.

In an embodiment, the meter population can be characterized as 1,000 meters in the system being uniformly distributed over the range of +/−2% with a standard deviation of 1.15. The total system error is defined by the sum of the meter error terms. This error can be estimated by computing the standard error on the sample mean of the sampling distribution using the formula stderr=stdv/sqrt(N) which provides a standard error=1.15/sqrt(1000)=0.0364 in this embodiment. To maintain a certainty of 99% on this estimate, the error percentage estimate may be multiplied by 3 because, under a normal distribution, 3 standard deviations covers roughly 99% of the samples. This results in 0.1091% for the currently presented embodiment.

The implication of this observation is that even if our meter error is uniformly distributed within +/−20% with only 1,000 meters, the disclosed system can still achieve a measurement accuracy of +/−1.1%.

Aggregate System Power Flow Inference

A power flow management system is responsible for producing an estimate of the aggregate power flow to or from a set of devices that are participating in system. By collecting individual power flow measurements from endpoints participating in the power flow management system and aggregating those measurements, the system produces an estimate for the aggregate power flow of the devices.

For the purposes of this disclosure, EVSE or should be understood to be Electric Vehicle Service Equipment, which is herein defined as a device that is a permanently installed piece of electric vehicle charging infrastructure that serves as an electric vehicle outlet. This type of equipment may include an energy meter.

For the purposes of this disclosure, aggregate power flow should be understood to be the sum of the power flows in a set of individual, distributed devices that are under the management of a power flow management system.

For the purposes of this disclosure, error bounds should be understood to be a limit on the magnitude of the error in the estimation of an aggregate power flow by a power flow management system. The error bounds on an aggregate power flow are specified with a level of confidence.

The devices that measure power flow at the endpoints of the systems (e.g. vehicles, homes, HVAC, EVSE) have non-ideal levels of measurement accuracy. That is, the power flow reported by the devices is the sum of the actual power flow and some amount measurement error (the error could be positive or negative).

By characterizing and modeling the measurement error of a class of devices, it is possible to produce error bounds for the power flow measurement of a population of devices by considering the device error model and the number of devices included in the computation.

Figure 10:
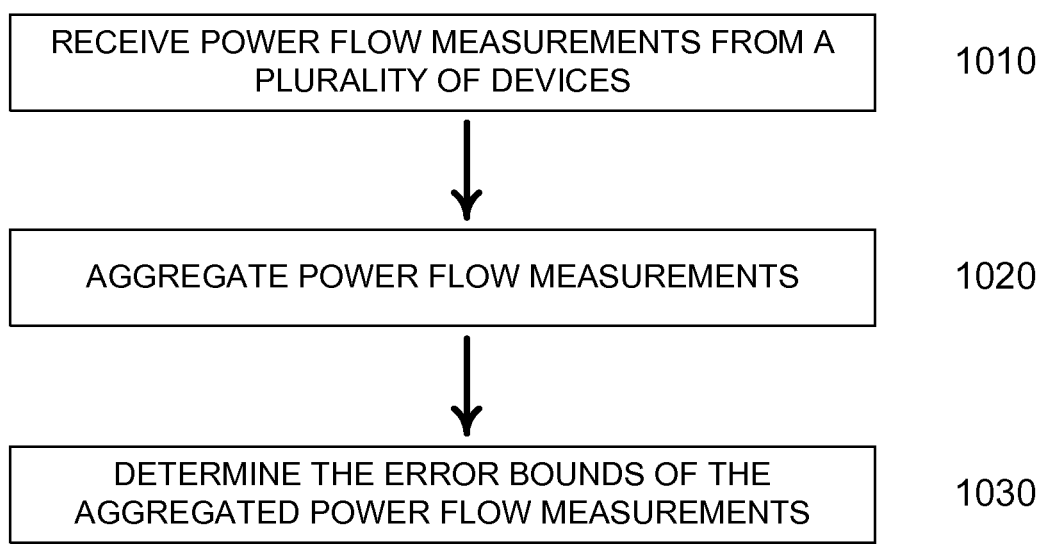
FIG. 10 is a block diagram illustrating a method for inferring an aggregate power flow for a power management system.

FIG. 10 illustrates a method for inferring an aggregate power flow for devices attached to a power management system. A plurality of power flow measurements are received 1010 from a plurality of devices, each device being associated with a power flow, each of the devices being capable of measuring the respective device's power flow within a measurement error. The plurality of power flow measurements are aggregated 1020, producing an aggregated power flow measurement. In one embodiment, the power flow aggregate for a set of devices can be computed as the sum of the individual measurements that are a part of the aggregate measure.

In one embodiment, the error bounds on an aggregate power flow measurement of a set of endpoints connected to a power flow management system can be additionally be computed. Making an assumption that the power flows at each individual device are independent and identically distributed (i.i.d.), the standard error of the aggregate power flow measurement can be computed by using the statistical definitions for i.i.d. random variables. That is, divide the error bounds of each individual device by the square root of the number of devices in the set to compute the standard error. The error on the aggregate power flow measurement is then bounded by multiplying the standard error by the number of standard deviations desired. For example, if a 95% confidence is desired, then the computed standard error value is scaled by 1.96 (the matching quartile for the normal distribution).

Power flow estimates can be produced for the entire system being managed by the power flow management system as well as for sub-parts (portions) of the complete system. Because the error bounds can be produced by an error model parameterized by the number of devices included in the computation, computing the error bounds for subsets of the device population requires adjusting the input (number of included devices) to the error model.

By modeling the measurement error in the measurement device at the endpoint, the power flow management system can compute the error bounds for the aggregate estimate of the power flow measurement at any point in the power flow management system.

This approach can support any meter error model and can even combine an arbitrary number of measurement error models. If the device type that performs the metering is known on a per-endpoint basis, it is possible to compute the number of instances of each device type contributing to the aggregate estimate. These individual devices counts are then used to feed the per-device-type model of error bounds.

In one embodiment, an error model for a set of devices of an identical type can be constructed. In one example of such an error model for a set of metering device, each individual device of a particular type is guaranteed to have all measurements within +/−N % of the true value.

In one embodiment, the error bounds of a subpart of the endpoints in a power flow management system can be computed. If it is needed to compute the error bounds for a subset of the endpoints under the management of the power flow management system, the standard error is computed by dividing the error bounds of an individual device by the square root of the number of devices in the subset. The error on the aggregate power flow measurement is then bounded by multiplying the standard error by the number of standard deviations we would like to capture in our estimate.

In various other embodiments, different error models are combined. One method for combining multiple error models (i.e. multiple types of power flow measurement devices) in the same power flow management system is to compute the weighted average of the error bounds for each set of devices described by a single error model where the weight is the percentage of total power measured by that set of devices.

Inferring AC Power Flow from DC Measurements

In a power flow management system, each endpoint device is responsible for reporting its own power consumption and production. In many cases, the endpoint device has sensors for measuring the Alternating Current (AC) power flow through the device (i.e. how much power the device is taking/delivering from/to the grid). However, some devices may not have the ability to produce accurate sensor data for the AC power flow of the device.

In cases where the device has other sensors that produce some information about the state and behavior of the system, it is possible to build an inference model for the AC power flow given the information for the other sensors. For example, in a battery charger, there may not be AC metering sensors, but their may be sensors that measure the battery's DC voltage and the DC current being used to charge it. If this additional information is available, then the battery charging device can be characterized such that accurate AC metering information can be inferred from the DC sensor readings.

Figure 11:
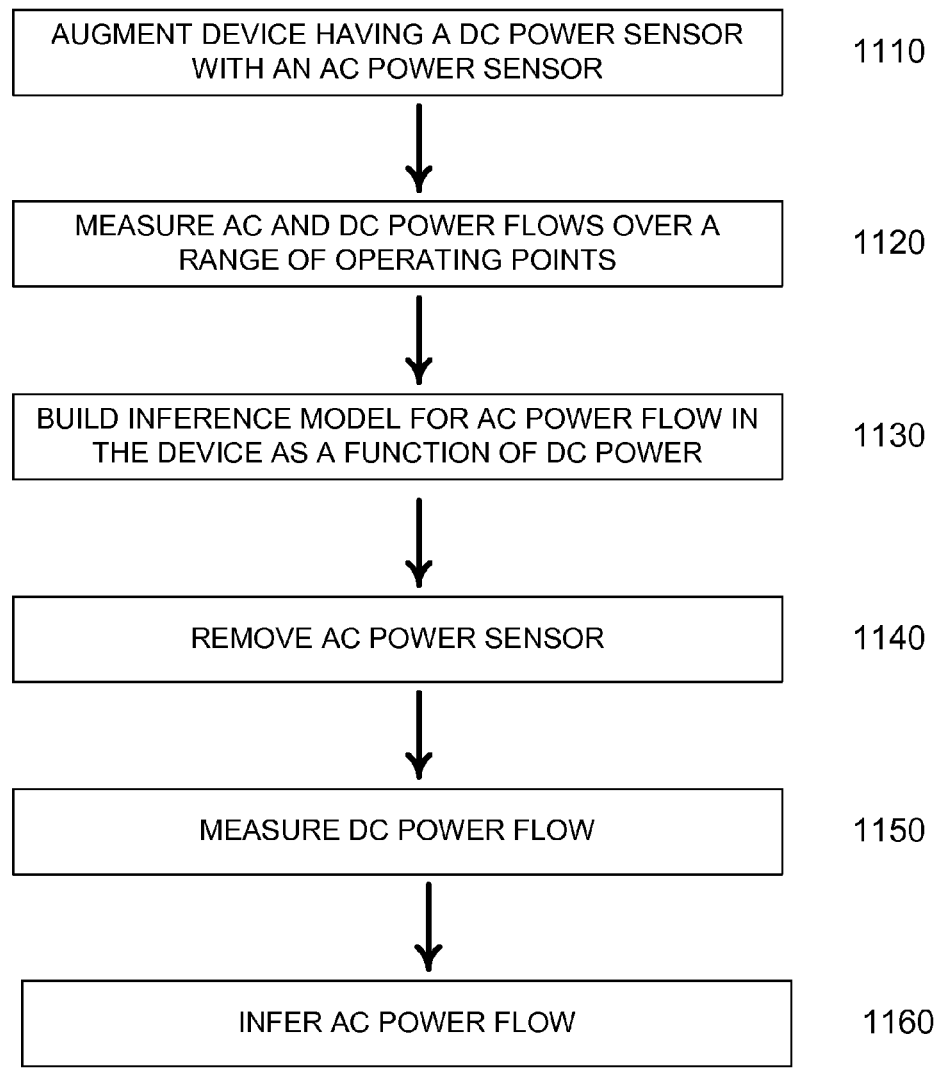
FIG. 11 is a block diagram illustrating a method for inferring AC power flow in a device from DC measurements.

FIG. 11 illustrates a method for inferring AC power flow in a device from DC measurements. A device having at least one DC power flow sensor is augmented 1110 with at least one AC power flow sensor. AC and DC power flow is then measured 1120 over a range of operating points. The power flows are then used to build 1130, using at least one computing device, an inference model of AC power flow in the device as a function of DC power flow, wherein the error of the model is bounded. The AC power flow sensor can then be removed 1140 from the device. DC power flows through the device can then be measured 1150 and used to infer 1160 the AC power flow for the device using the inference model and measurements from the at least one DC power flow sensor.

By augmenting a single device with AC metering sensors, it is possible to build an accurate inference model by gathering AC and DC sensor information for the devices, developing a model that produces the inferred AC metering outputs given the DC measurements, and bounding the error of the model and inference outputs. With this model in place, it is possible to apply this model to the DC readings of other similar devices to infer the AC power flow information of these devices without augmenting them with AC metering sensors.

If a set of devices is available, augmenting each of them with AC metering sensors enables the construction of a set of inference models for AC power flow from DC sensor information. Using this set of information, it is possible to construct a single model and its error bounds when applied to any of the devices in the set.

Consider a battery charging system that contains a battery charger and a rechargeable battery. When the battery charger is plugged into the grid, it is capable of charging the battery by passing DC current into the battery. This system is able to sense the DC (direct current) battery voltage and current directly. However, this system does not require or have AC power flow sensors.

To build an inference model for the AC power flow in this battery charging system, the system can be temporarily augmented with AC power flow sensors. By taking readings from the DC voltage, DC current, and AC power flow sensors for a broad range of operating points of this system, enough data can be collected to build a model of the AC power flow as a function of the DC current and voltage.

One such model may be a linear regression that scales some constant, M, by the DC power (DC voltage times DC current) plus some fixed offset, B. Given the full set of readings for AC power, it is possible to calculate the values of M and B to produce an approximation of the AC power from the DC power.

CONCLUSION

Although systems and methods have been described in language specific to structural features and/or methodological acts, it is to be understood that the subject matter defined in the appended claims is not necessarily limited to the specific features or acts described. Rather, the specific features and acts are disclosed as examples of implementations of the claimed methods, devices, systems, etc. It will be understood by those skilled in the art that various changes in form and details may be made therein without departing from the spirit and scope of the invention.

What is claimed is:

1. A method comprising:
   receiving, over a network, a plurality of power flow measurements from each of a plurality of devices, each device being associated with a power flow, each of the devices being capable of measuring the respective device's power flow within a measurement error;
   aggregating, using at least one computing device, the plurality of power flow measurements, producing an aggregated power flow measurement;
   determining, using at least one computing device, error bounds of the aggregated power flow measurement using at least one error model;
   wherein the plurality of devices comprises at least two sets of devices, each set of devices comprising at least one device of the same type and being described by a device error model, wherein the error bounds are computed as a weighted average of the error models of the respective set of devices where the weight is the percentage of total power measured by the respective set of devices.

2. The method of claim 1 wherein the aggregated power flow measurement is the sum of the individual measurements of each of the plurality of devices.

3. The method of claim 1 wherein one or more of the at least one error models is an error model for a subset of the plurality of devices comprising devices of an identical type.

4. The method of claim 3 wherein the error model for the subset of the plurality of devices of an identical type holds that all such devices have all measurements within +/−N % of the true value.

5. The method of claim 1 wherein the at least one error model assumes that power flows at each respective device are independent and identically distributed.

6. The method of claim 5 wherein a standard error of the aggregated power flow measurement is calculated by dividing the error bounds of each of the plurality of devices by the square root of the number of devices in the plurality of devices, and wherein the error bounds of the aggregated power flow measurement is calculated by multiplying the standard error by a fixed number of standard deviations corresponding to a desired level of confidence.

7. A system comprising:
   a plurality of devices, each device being associated with a power flow, each of the devices being capable of measuring the respective device's power flow within a measurement error;
   an aggregate power measurement module comprising one or more processors programmed to execute software code retrieved from a computer readable storage medium storing software for:

receiving, over a network, a plurality of power flow measurements from each of the plurality of devices;

aggregating the plurality of power flow measurements, producing an aggregated power flow measurement;

determining error bounds of the aggregated power flow measurement using at least one error model;

wherein the plurality of devices comprises at least two sets of devices, each set of devices comprising at least one device of the same type and being described by a device error model, wherein the error bounds are computed as a weighted average of the error models of the respective set of devices where the weight is the percentage of total power measured by the respective set of devices.

8. The system of claim 7 wherein the aggregated power flow measurement is the sum of the individual measurements of each of the plurality of devices.

9. The system of claim 7 wherein one or more of the at least one error models is an error model for a subset of the plurality of devices comprising devices of an identical type.

10. The system of claim 9 wherein the error model for the subset of the plurality of devices of an identical type holds that all such devices have all measurements within +/−N % of the true value.

11. The system of claim 7 wherein the at least one error model assumes that power flows at each respective device are independent and identically distributed.

12. The system of claim 11 wherein a standard error of the aggregated power flow measurement is calculated by dividing the error bounds of each of the plurality of devices by the square root of the number of devices in the plurality of devices, and wherein the error bounds of the aggregated power flow measurement is calculated by multiplying the standard error by a fixed number of standard deviations corresponding to a desired level of confidence.

13. A non-transitory computer-readable medium having computer-executable instructions for a method comprising the steps of:

receiving, over a network, a plurality of power flow measurements from each of a plurality of devices, each device being associated with a power flow, each of the devices being capable of measuring the respective device's power flow within a measurement error;

aggregating, using at least one computing device, the plurality of power flow measurements, producing an aggregated power flow measurement;

determining, using at least one computing device, error bounds of the aggregated power flow measurement using at least one error model;

wherein the plurality of devices comprises at least two sets of devices, each set of devices comprising at least one device of the same type and being described by a device error model, wherein the error bounds are computed as a weighted average of the error models of the respective set of devices where the weight is the percentage of total power measured by the respective set of devices.

14. The computer-readable medium of claim 13 wherein the aggregated power flow measurement is the sum of the individual measurements of each of the plurality of devices.

15. The computer-readable medium of claim 13 wherein one or more of the at least one error models is an error model for a subset of the plurality of devices comprising devices of an identical type.

16. The computer-readable medium of claim 15 wherein the error model for the subset of the plurality of devices of an identical type holds that all such devices have all measurements within +/−N % of the true value.

17. The computer-readable medium of claim 13 wherein the at least one error model assumes that power flows at each respective device are independent and identically distributed.

18. The computer-readable medium of claim 17 wherein a standard error of the aggregated power flow measurement is calculated by dividing the error bounds of each of the plurality of devices by the square root of the number of devices in the plurality of devices, and wherein the error bounds of the aggregated power flow measurement is calculated by multiplying the standard error by a fixed number of standard deviations corresponding to a desired level of confidence.

* * * * *